United States Patent [19]

DiGiosia

[11] Patent Number: 5,286,125
[45] Date of Patent: Feb. 15, 1994

[54] KEYBOARD AND KEY GUIDE FRAME ARRANGEMENT

[76] Inventor: Antonio G. DiGiosia, 12800 Woodforest #1215, Houston, Tex. 77015

[21] Appl. No.: 976,579

[22] Filed: Nov. 16, 1992

[51] Int. Cl.⁵ .............................................. B41J 29/00
[52] U.S. Cl. ..................................... 400/715; 400/472
[58] Field of Search ............... 400/472, 480, 483, 481, 400/488, 491, 491.1, 493.1, 82, 122, 715; 341/22, 23; 364/708, 709.1; 235/145 R, 146

[56] References Cited

U.S. PATENT DOCUMENTS

| | | | |
|---|---|---|---|
| 1,385,356 | 7/1921 | Bates | 400/494 |
| 3,627,927 | 12/1971 | Schmitz et al. | 400/491 |
| 3,693,775 | 9/1972 | Brooks et al. | 400/480 |
| 4,032,729 | 6/1977 | Koistinen | 235/145 R |
| 4,075,465 | 2/1978 | Funk et al. | 235/145 R |
| 4,363,942 | 12/1982 | Deeg et al. | 400/495 |
| 5,096,317 | 3/1992 | Phillippe | 235/145 R |

*Primary Examiner*—Edgar S. Burr
*Assistant Examiner*—Ren Yan
*Attorney, Agent, or Firm*—Leon Gilden

[57] ABSTRACT

A keyboard assembly includes a top wall having reciprocatably mounted keys mounted thereon, wherein each of the keys have a concave surface and includes a continuous flexible framework grid in surrounding relationship relative to each of the keys to prevent double strike of keys in use of the keyboard arrangement. A modification of the invention is arranged to include arcuate bumper strips mounted to a top surface of the grid to further direct an individual's fingers into desired individual keys of the keyboard.

5 Claims, 4 Drawing Sheets

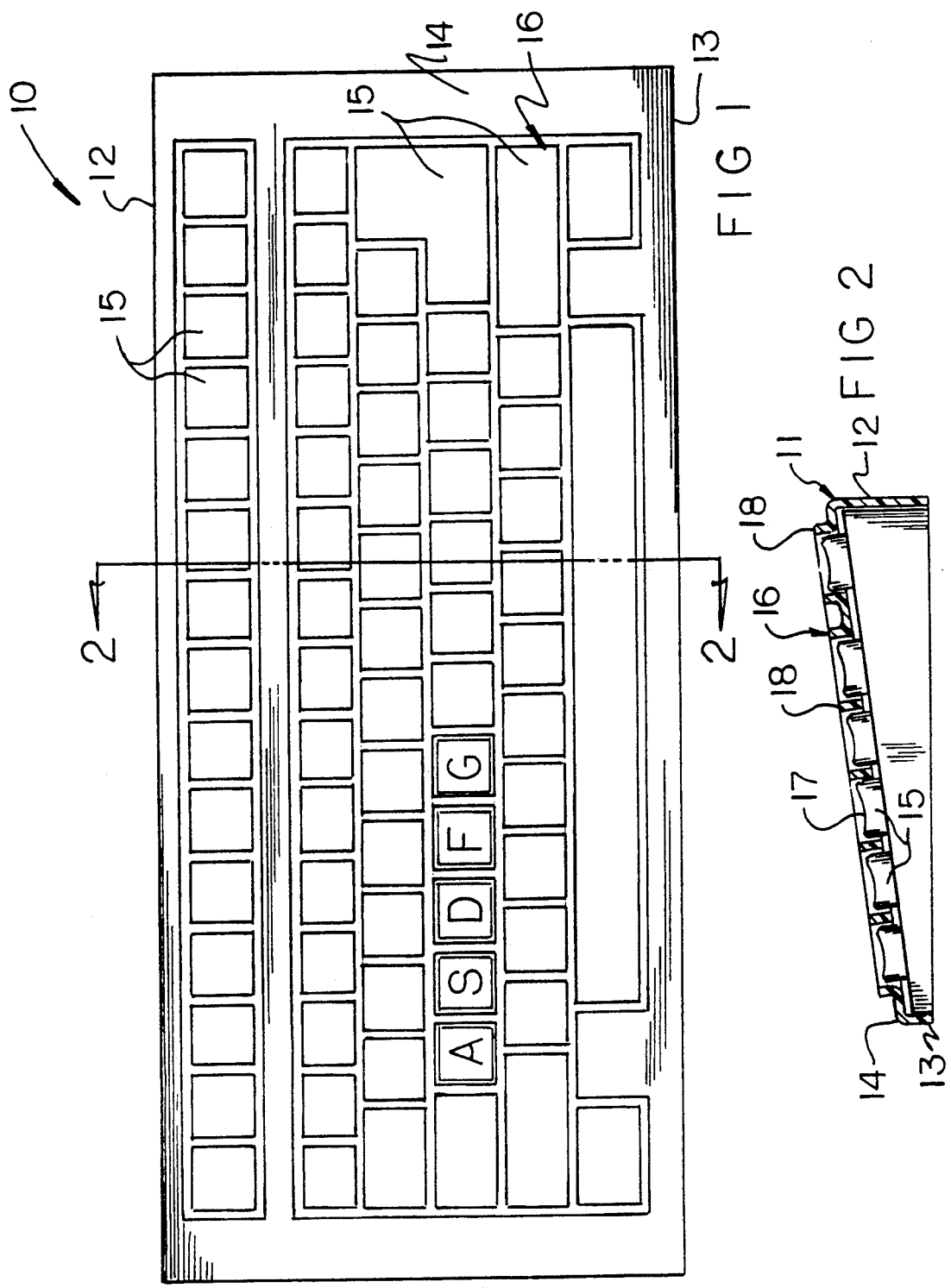

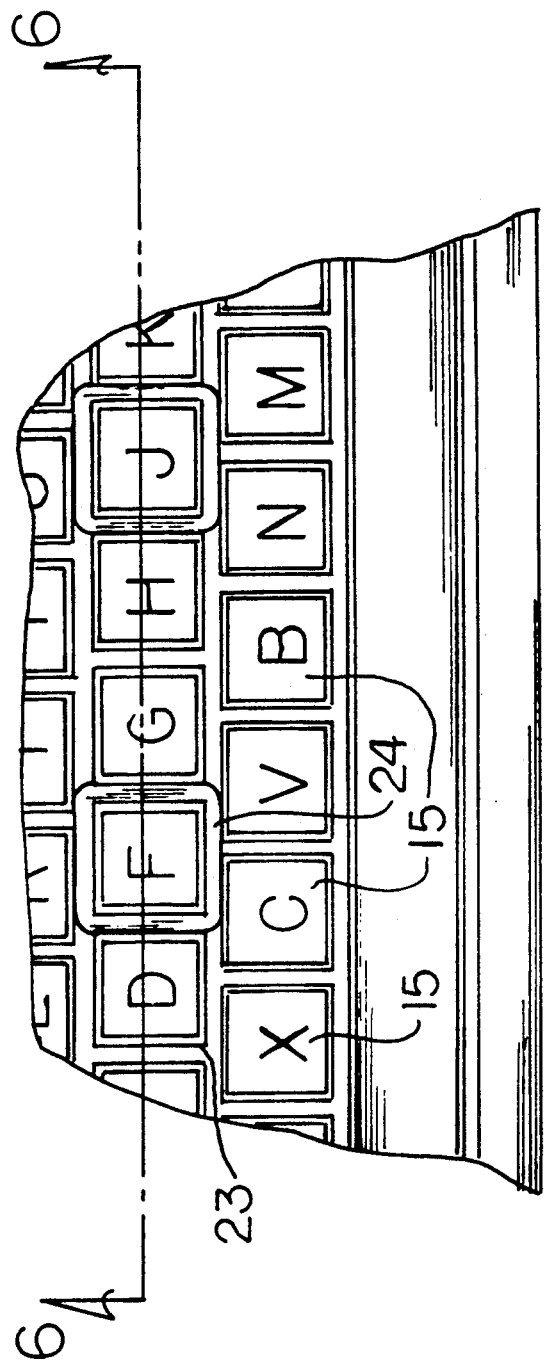

KEYBOARD AND KEY GUIDE FRAME ARRANGEMENT

BACKGROUND OF THE INVENTION

1. Field of the Invention

The field of invention relates to keyboard apparatus, and more particularly pertains to a new and improved keyboard and key guide frame arrangement wherein the same is arranged to direct individuals to individual keys preventing double strike of the keys of the keyboard.

2. Description of the Prior Art

Various assists in the use of a keyboard structure have been available in the prior art and have been exemplified in the use of Braille type assists such as indicated in the U.S. Pat. Nos. 4,985,692 and 4,079,825.

Typically, with individuals in the process of learning or attempting to communicate by the use of the keyboard and wherein physical dexterity is limited, the instant invention attempts to overcome deficiencies of the prior art by providing for a grid framework arranged in surrounding relationship to each key of the keyboard to prevent double strike and further assist in guiding an individual's fingers into communication with the individual keys of the keyboard structure and in this respect, the present invention substantially fulfills this need.

SUMMARY OF THE INVENTION

In view of the foregoing disadvantages inherent in the known types of keyboard apparatus now present in the prior art, the present invention provides a keyboard and key guide frame arrangement wherein the same is arranged to provide for a surrounding perimeter wall about each key of an associated keyboard. As such, the general purpose of the present invention, which will be described subsequently in greater detail, is to provide a new and improved keyboard and key guide frame arrangement which has all the advantages of the prior art keyboard apparatus and none of the disadvantages.

To attain this, the present invention provides a keyboard assembly including a top wall having reciprocatably mounted keys mounted thereon, wherein each of the keys have a concave surface and includes a continuous flexible framework grid in surrounding relationship relative to each of the keys to prevent double strike of keys in use of the keyboard arrangement. A modification of the invention is arranged to include arcuate bumper strips mounted to a top surface of the grid to further direct an individual's fingers into desired individual keys of the keyboard.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved keyboard and key guide frame arrangement which has all the advantages of the prior art keyboard apparatus and none of the disadvantages.

It is another object of the present invention to provide a new and improved keyboard and key guide frame arrangement which may be easily and efficiently manufactured and marketed.

It is a further object of the present invention to provide a new and improved keyboard and key guide frame arrangement which is of a durable and reliable construction.

An even further object of the present invention is to provide a new and improved keyboard and key guide frame arrangement which is susceptible of a low cost of manufacture with regard to both materials and labor, and which accordingly is then susceptible of low prices of sale to the consuming public, thereby making such keyboard and key guide frame arrangements economically available to the buying public.

Still yet another object of the present invention is to provide a new and improved keyboard and key guide frame arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the keyboard arrangement of the invention.

FIG. 2 is an orthographic view, taken along the lines 2—2 of FIG. 1 in the direction indicated by the arrows.

FIG. 5 is an orthographic partial top view of the keyboard employing guide lip frames of various heights.

FIG. 6 is an orthographic view, taken along the lines 6—6 of FIG. 5 in the direction indicated by the arrows.

DESCRIPTION OF THE PREFERRED EMBODIMENT

Figure 3:
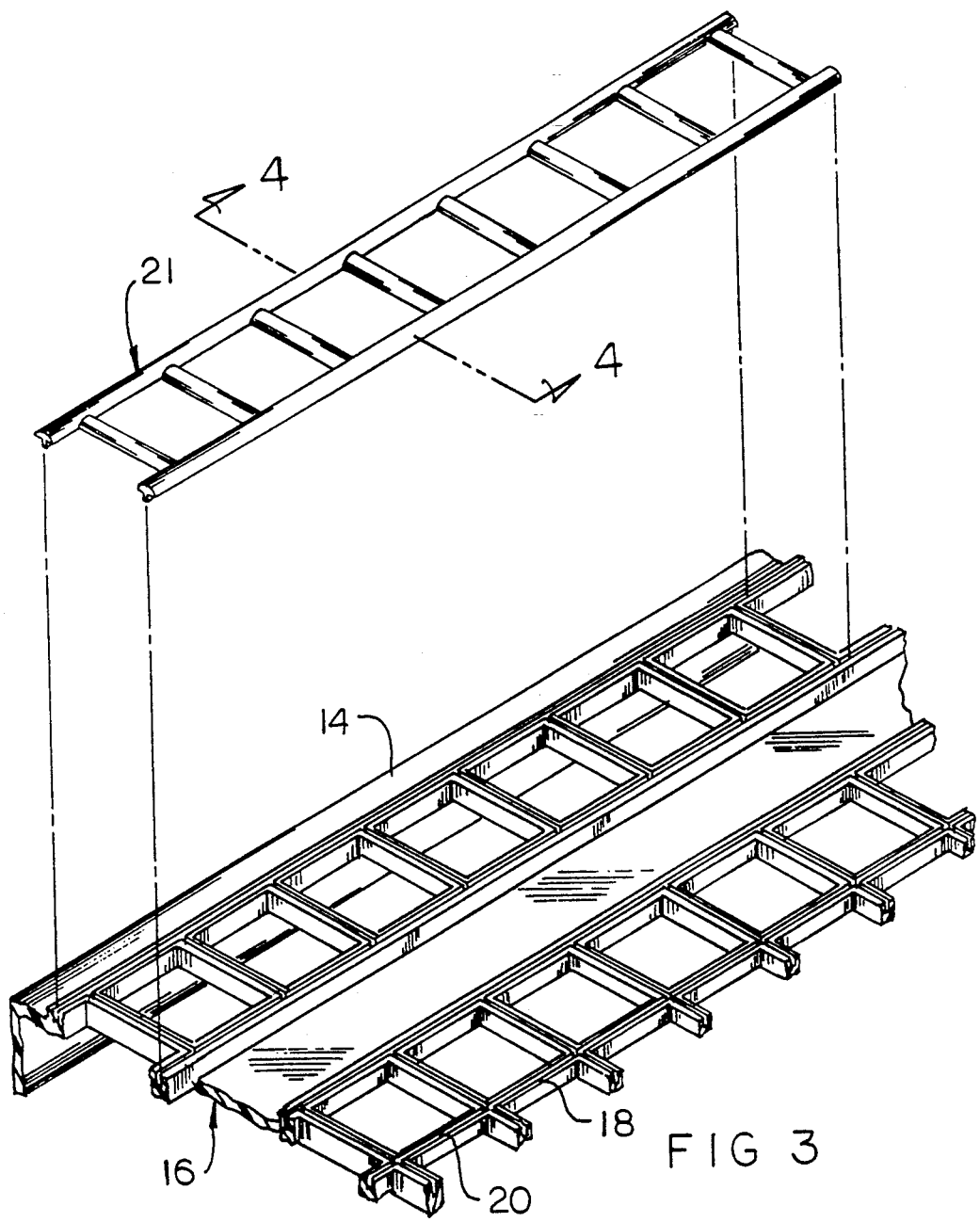
FIG. 3 is an isometric illustration of the framework grid further employing an arcuate guide lip mounted thereto.
Figure 4:
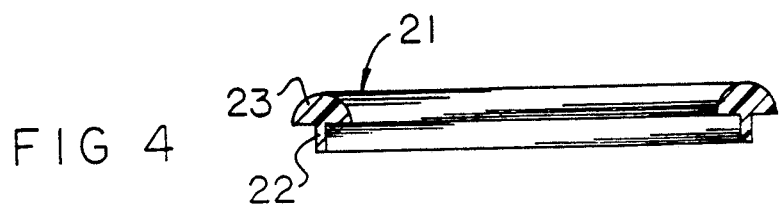
FIG. 4 is an orthographic view, taken along the lines 4—4 of FIG. 3 in the direction indicated by the arrows.

With reference now to the drawings, and in particular to FIGS. 1 to 9 thereof, a new and improved keyboard and key guide frame arrangement embodying the principles and concepts of the present invention and generally designated by the reference numeral 10 will be described.

More specifically, the keyboard and key guide frame arrangement 10 of the instant invention essentially comprises a keyboard housing 11 formed with a first end wall 12 of a first height spaced from a second end wall 13 of a second height less than the first height, wherein a top wall 14 is canted from the first end wall 12 towards the second end wall 13, including a matrix of key members 15 reciprocatably mounted through the top wall 14 in a biased extension relative to the top wall in a conventional manner for use of the keyboard structure. The individual key members 15 include a concave top wall 17 to accommodate an individual's fingers to assist in positioning the individual's fingers medially of each key member 15. Further, a flexible framework grid 16 is provided of continuous construction such as exemplified in FIGS. 2, 3, and 6 for example, wherein the framework grid 16 includes walls having a grid wall top wall surface 18 oriented above each key member 15. In this manner, the individual's keys are prevented from a double strike of a plurality of keys and further assist in directing an individual's fingers onto communication with individual desired key members 15. Further, the top wall surface 18 is typically oriented parallel relative to the housing top wall 14. With reference to the FIGS. 3 and 4 for example indicate the organization further employing resilient guide lips 21 mounted to the top wall surface 18. To this end, each top wall surface includes a top wall surface groove 20 of continuous construction directed throughout the grid wall top wall surface 18. The top wall surface groove 20 is oriented medially and coextensively relative to the grid wall top wall surface 18 for receiving a guide lip flange 22 therewithin. The guide lip flange 22 mounts an arcuate guide bumper 23 at an uppermost end thereof, wherein the arcuate guide bumper 23 is arranged for contiguous communication and mounting upon the top wall surface 18 to further assist in guidance of an individual's fingers onto individual keys, in a manner as indicated in FIG. 6. If desired, further arcuate key bumpers 24 having a second height greater than the first height of the arcuate guide bumpers 23 may be provided to further direct an individual's fingers onto difficult keys or keys that are more frequently struck to permit enhanced education of an individual's fingers directed towards predetermined keys, such as indicated in the FIGS. 5 and 6.

Figure 7:
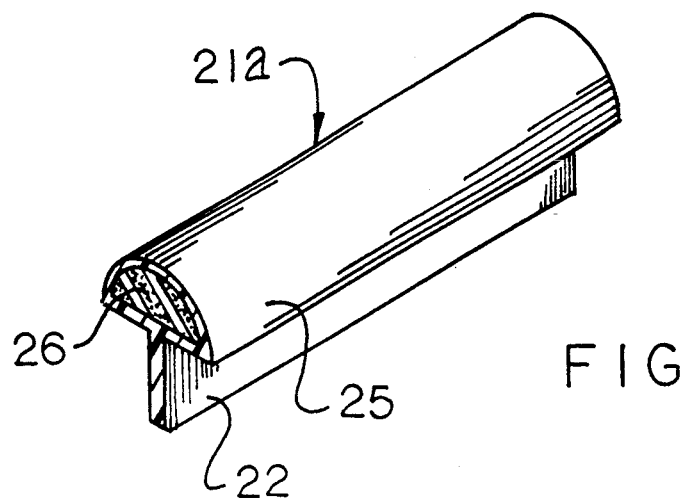
FIG. 7 is an isometric illustration of a modified guide lip structure.

The FIG. 7 indicates a modified guide lip structure 21a having an arcuate shell 25 formed integrally and orthogonally relative to the guide lip flange 22, wherein the arcuate shell 25 is filled with a polymeric foam core 26 to provide for enhanced cushioning to an individual's fingers minimizing associated soreness upon repetitive use of the keyboard structure.

Figure 8:
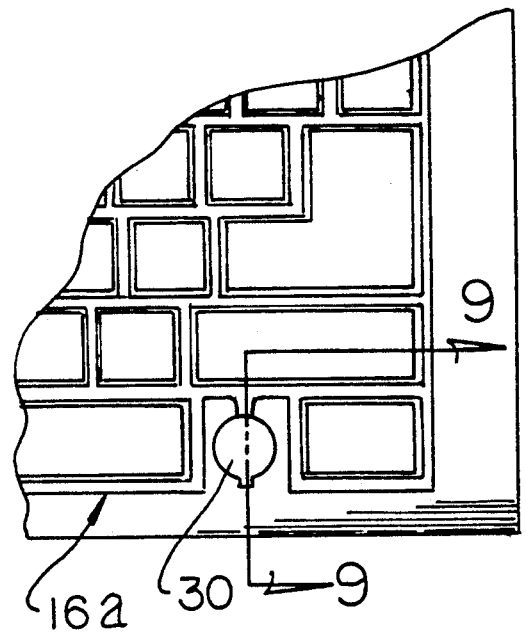
FIG. 8 is an orthographic top view for use of a modified framework grid.
Figure 9:
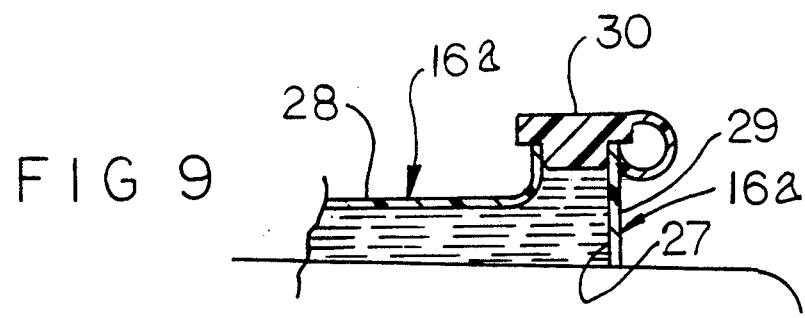
FIG. 9 is an orthographic view, taken along the lines 9—9 of FIG. 8 in the direction indicated by the arrows.

The FIG. 8 further indicates the organization to optionally employ a modified framework grid structure 16a that is of a hollow construction, such as indicated in FIG. 9, filled with a compressible fluid 28. The fluid is directed into the fluid cavity 27 of the modified framework grid 16a through a fill port 29 having a fill port cap 30. In this manner, relative resistance of the modified grid 16a is afforded by the filling to desired predetermined fluid levels within the modified grid structure 16a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A keyboard and key guide framework arrangement, comprising,
   a keyboard having a keyboard housing, with the housing having a first end wall of a first height spaced from and parallel a second end wall of a second height, wherein the second height is less than the first height, and
   a housing top wall extending from the first end wall canted towards the second end wall, and
   a plurality of keyboard members reciprocatably mounted through the housing top wall, with each of the keyboard members including a key concave top wall, and
   a continuous flexible framework grid arranged in surrounding relationship to each key member of said key members, and
   the framework grid includes a continuous framework wall, and said wall is arranged to extend above each key member, with the framework wall having a top wall surface spaced above each key concave top wall, with the top wall surface parallel to the housing top wall, and
   the top wall surface includes a top wall surface groove coextensive with the top wall surface, and a resilient guide lip mounted within the top wall surface groove.

2. A guide frame arrangement as set forth in claim 1 wherein the guide lip includes a guide lip flange secured within the top wall groove, and the guide lip flange further includes an arcuate guide bumper mounted fixedly and orthogonally to the guide lip flange in contiguous communication with the top wall surface projecting beyond the top wall surface a predetermined height in surrounding relationship to each key member of said key members.

3. A guide frame arrangement as set forth in claim 2 wherein said arcuate guide bumper includes a further guide bumper portion in surrounding relationship to at least one of said key members, having a further height greater than said predetermined height for enhanced guidance into said at least one key member.

4. A guide frame arrangement as set forth in claim 3 wherein said arcuate guide bumper and said further arcuate guide bumper includes a polymeric arcuate shell having a polymeric foam core coextensively directed within the shell.

5. A guide frame arrangement as set forth in claim 4 wherein the flexible framework grid includes a continuous fluid cavity directed coextensively throughout the flexible framework grid, with the cavity having a compressible fluid therewithin, and a fill port in fluid communication with the cavity, with the fill port having a fill port cap permitting selective filling of the cavity with said fluid.

* * * * *